US012774764B2

(12) United States Patent
Johnson et al.

(10) Patent No.: US 12,774,764 B2
(45) Date of Patent: Oct. 27, 2026

(54) PIPE SPACER

(71) Applicant: AIRBUS OPERATIONS LIMITED, Bristol (GB)

(72) Inventors: Callum Johnson, Bristol (GB); Anthony Bryant, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 399 days.

(21) Appl. No.: 18/514,435

(22) Filed: Nov. 20, 2023

(65) Prior Publication Data

US 2024/0174373 A1 May 30, 2024

(30) Foreign Application Priority Data

Nov. 25, 2022 (GB) .................................... 2217745

(51) Int. Cl.

| | |
|---|---|
| ***F16L 9/18*** | (2006.01) |
| ***B64D 37/30*** | (2006.01) |
| ***F16L 3/10*** | (2006.01) |
| ***F16L 7/00*** | (2006.01) |
| ***F16L 11/20*** | (2006.01) |
| ***F16L 39/00*** | (2006.01) |

(Continued)

(52) U.S. Cl.
CPC ................ *F16L 9/18* (2013.01); *B64D 37/30* (2013.01); *F16L 3/1091* (2013.01); *F16L 7/00* (2013.01); *F16L 39/00* (2013.01); *F16L 39/005* (2013.01); *F16L 39/04* (2013.01); *F16L 59/065* (2013.01); *F16L 11/20* (2013.01); *F16L 59/00* (2013.01)

(58) Field of Classification Search
CPC ..... B64D 37/005; B64D 37/30; F16L 3/1091; F16L 7/00; F16L 9/18; F16L 56/065; F16L 11/20; F16L 39/00; F16L 39/005; F16L 55/00; F16L 55/39; F16L 55/04; F16L 59/00; F02C 7/222
See application file for complete search history.

(56) References Cited

U.S. PATENT DOCUMENTS

| | | | |
|---|---|---|---|
| 4,754,782 | A | 7/1988 | Grantham |
| 6,015,015 | A | 1/2000 | Luft |

(Continued)

FOREIGN PATENT DOCUMENTS

| | | | |
|---|---|---|---|
| DE | 2048424 | A1 | 4/1972 |
| DE | 30 33 167 | A1 | 3/1982 |

(Continued)

OTHER PUBLICATIONS

UKIPO Search Report for Application No. GB 2217745.5, two pages, dated Dec. 18, 2023.

(Continued)

*Primary Examiner* — William M McCalister
(74) *Attorney, Agent, or Firm* — Nixon & Vanderhye, PC

(57) ABSTRACT

A pipe spacer for separating inner and outer pipes of a double-walled pipe is disclosed including an inner circumferential bearing surface for contacting an inner pipe of a double-walled pipe assembly; an outer circumferential bearing surface for contacting an outer pipe of the double-walled pipe assembly; at least three inner lobes, each of the inner lobes having an apex on which lies the inner circumferential bearing surface; and the outer circumferential bearing surface is curved in two orthogonal directions.

20 Claims, 9 Drawing Sheets

(51) Int. Cl.

| | |
|---|---|
| ***F16L 39/04*** | (2006.01) |
| ***F16L 59/065*** | (2006.01) |
| *F16L 59/00* | (2006.01) |

(56) References Cited

U.S. PATENT DOCUMENTS

| | | | | |
|---|---|---|---|---|
| 6,981,525 | B2 | 1/2006 | Foxton | |
| 7,226,243 | B2 | 6/2007 | Lee et al. | |
| 7,399,002 | B2 | 7/2008 | Motew et al. | |
| 8,122,914 | B2 | 2/2012 | Menardo et al. | |
| 8,127,801 | B2 | 3/2012 | Brower | |
| 8,616,246 | B2 | 12/2013 | Dinon et al. | |
| 8,991,871 | B2 | 3/2015 | Weinhold | |
| 9,310,023 | B2 * | 4/2016 | Regan | B64D 37/32 |
| 9,447,899 | B2 * | 9/2016 | Minami | F16L 3/1222 |
| 2013/0087238 | A1 | 4/2013 | Mercier | |
| 2013/0312865 | A1 * | 11/2013 | Baur | F16L 9/18 219/121.64 |
| 2015/0291290 | A1 | 10/2015 | Leachman | |

FOREIGN PATENT DOCUMENTS

| | | | |
|---|---|---|---|
| DE | 3116338 | A1 | 11/1982 |
| DE | 198 44 555 | A1 | 4/2000 |
| DE | 102005047951 | A1 | 4/2007 |
| EP | 2 846 023 | A1 | 3/2015 |
| FR | 2978521 | A1 | 2/2013 |
| GB | 2126313 | A | 3/1984 |
| GB | 2614885 | A | 7/2023 |
| KR | 101045835 | B1 | 7/2011 |
| WO | 2005106306 | A1 | 11/2005 |
| WO | 2011050801 | A2 | 5/2011 |

OTHER PUBLICATIONS

Search Report for GB2217745.5, dated May 16, 2023, 8 pages.

EP Search Report for Application No. 23211205.2-1015, seven pages, dated Apr. 30, 2024.

* cited by examiner

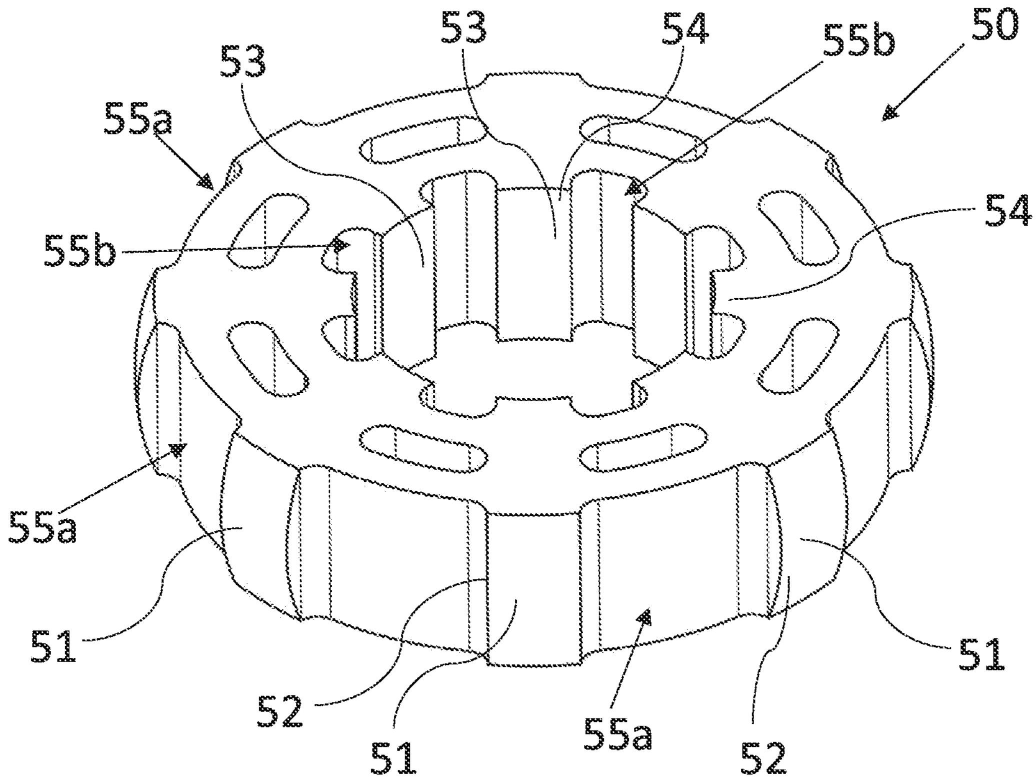
*FIG. 9*
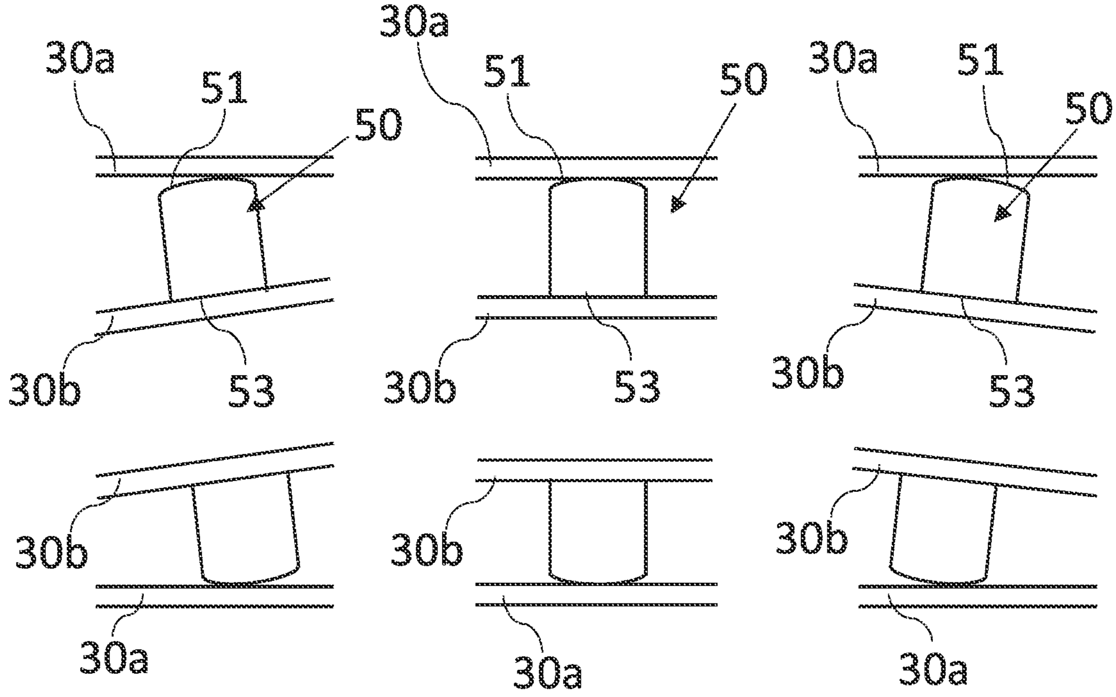
*FIG. 10A* *FIG. 10B* *FIG. 10C*

PIPE SPACER

CROSS RELATED APPLICATION

This application claims priority to United Kingdom Patent Application GB 2217745.5, filed Nov. 25, 2022, the entire contents of which is hereby incorporated by reference.

FIELD OF THE INVENTION

The present invention relates to a pipe spacer, a double-walled pipe assembly comprising the pipe spacer, and an aircraft assembly.

BACKGROUND OF THE INVENTION

Hydrogen fuel lines are typically double-walled, with the interspace between the inner and outer pipes maintained at vacuum pressure in order to reduce thermal transfer between the fuel and atmosphere, and thereby maintain the cryogenic temperature of the fuel.

Hydrogen fuel lines are generally quite stiff and typically span long distances across the aircraft wing between the fuel tanks and engines, or fuel tanks and refuel couplings, with the fuel lines expected to bend and twist in accordance with the bend and twist of the wing. This presents a number of challenges.

SUMMARY OF THE INVENTION

A first aspect of the invention provides a pipe spacer for separating inner and outer pipes of a double-walled pipe assembly, the pipe spacer comprising: an inner circumferential bearing surface for contacting an inner pipe of a double-walled pipe assembly; an outer circumferential bearing surface for contacting an outer pipe of the double-walled pipe assembly; at least three inner lobes, each of the inner lobes having an apex on which lies the inner circumferential bearing surface; wherein the outer circumferential bearing surface is curved in two orthogonal directions.

With this arrangement, reduced contact between the pipe spacer and the outer pipe of a double-walled pipe assembly is achieved, thereby decreasing thermal transfer (by conduction). The arrangement having a double curved surface also provides for relative rotation between the inner and outer pipes. The arrangement is also able to transfer loads when there is some mis-alignment between the inner and outer pipes.

The outer circumferential bearing surface may be spherical. This provides for rotation between the inner and outer pipes without introducing loads. A sphere provides for a constant diameter at any angle of rotation, and thereby maintains a fixed spacing between the inner and outer pipes.

The curvature of the outer circumferential bearing surface may extend across the axial extent of the pipe spacer. This allows the full axial extent of the pipe spacer to be used for providing for rotation between the inner and outer pipes whilst maintaining line contact.

The inner circumferential bearing surface may be cylindrical. This can help stabilise the orientation of the pipe spacer with respect to the inner pipe. This can also reduce the risk of misalignment.

The pipe spacer may comprise three or more outer lobes, each of the outer lobes having an apex on which lies the outer circumferential bearing surface. This provides for decreased contact area between the pipe spacer and the outer pipe, thereby reducing thermal transfer via conduction. The recesses between the lobes can also provide a room for additional vacuum space, thereby reducing thermal transfer.

A centre of each inner lobes may align circumferentially with a centre of each outer lobes. This provides a direct radial load path across the pipe spacer.

The outer lobes may occupy less than or equal to 50% of the circumference of the pipe spacer. This reduces the contact between the pipe spacer and the outer pipe.

The pipe spacer may define three or more through-holes located between the inner and outer circumferential bearing surfaces. The through-holes extend through the pipe spacer in an axial direction, and create space for a vacuum in the interspace of the pipe assembly. This can help reduce thermal transfer between the inner and outer pipes by minimising the reduction in vacuum space caused by introducing the spacer.

A centre of the through-holes may be aligned circumferentially with a centre of the inner and/or outer lobes. This can create a tortuous thermal path, so as to reduce thermal transfer across the pipe spacer.

The through-holes may be offset circumferentially from the inner and/or outer lobes. This decreases any disturbance of the load path across the pipe spacer caused by the through-holes.

The pipe spacer may have a diameter to thickness aspect ratio of less than 6:1. A low aspect ratio increases the structural integrity of the pipe spacer and increases the buckling load.

The pipe spacer may be formed of fibre reinforced composite material, optionally glass fibre reinforced composite material. This provides a material with high specific strength and stiffness, as well as good thermal properties.

A second aspect of the invention provides a double-walled pipe assembly comprising an inner pipe and an outer pipe separated by the pipe spacer of the first aspect.

The inner pipe may comprise first and second flanges extending radially from the inner pipe towards the outer pipe, wherein the pipe spacer is located between the first and second flanges such that axial movement of the pipe spacer is restricted. This arrangement fixes the position of the spacer, whilst still allowing rotation of the spacer relative to the outer pipe.

The double-walled pipe assembly may comprise a vacuum pressure between the inner pipe and the outer pipe.

The double-walled pipe assembly may comprise a cryogenic fuel in the inner pipe.

The cryogenic fuel may be liquid hydrogen.

A third aspect of the invention provides an aircraft assembly comprising an aircraft structure, a fixture arrangement, and the double-walled pipe assembly of the second aspect coupled to the aircraft structure by the fixture arrangement.

The fixture arrangement may contact the outer pipe in a plane which passes through the pipe spacer. This enables radial forces, such as radial forces, to be transmitted more directly from the fixture arrangement to the inner pipe via the pipe spacer.

The aircraft structure may be a wing rib. The double-walled pipe assembly may pass through a plane of the wing rib.

The aircraft structure may be a fairing rib (leading or trailing edge fairing). The double-walled pipe assembly may pass through a plane of the fairing rib.

The aircraft structure may be a fuselage frame. The double-walled pipe assembly may pass through a plane of the fuselage frame.

A fourth aspect of the invention provides an aircraft assembly comprising: an aircraft structure; a double-walled pipe assembly coupled to the aircraft structure by a fixture arrangement, the double-walled pipe assembly comprising inner and outer pipes; and a pipe spacer separating the inner and outer pipes, wherein the fixture arrangement contacts the outer pipe in a plane which passes through the pipe spacer.

This enables radial forces, such as radial forces, to be transmitted more directly from the fixture arrangement to the inner pipe via the pipe spacer.

The aircraft structure may be a wing structure. The wing structure may be a wing rib or a fairing rib. The aircraft structure may be a fuselage frame.

The double-walled pipe assembly may be configured to rotate about axes perpendicular to a longitudinal axis of the pipe assembly.

BRIEF DESCRIPTION OF THE DRAWINGS

Embodiments of the invention will now be described with reference to the accompanying drawings, in which:

FIG. 9 shows a perspective view of a pipe spacer according to a first example;

FIG. 10A shows an inner pipe rotated in a first direction with respect to the outer pipe;

FIG. 10B shows the inner pipe aligned with the outer pipe;

FIG. 10C shows the inner pipe rotated in a second direction with respect to the outer pipe;

DETAILED DESCRIPTION OF EMBODIMENT(S)

Figure 1:
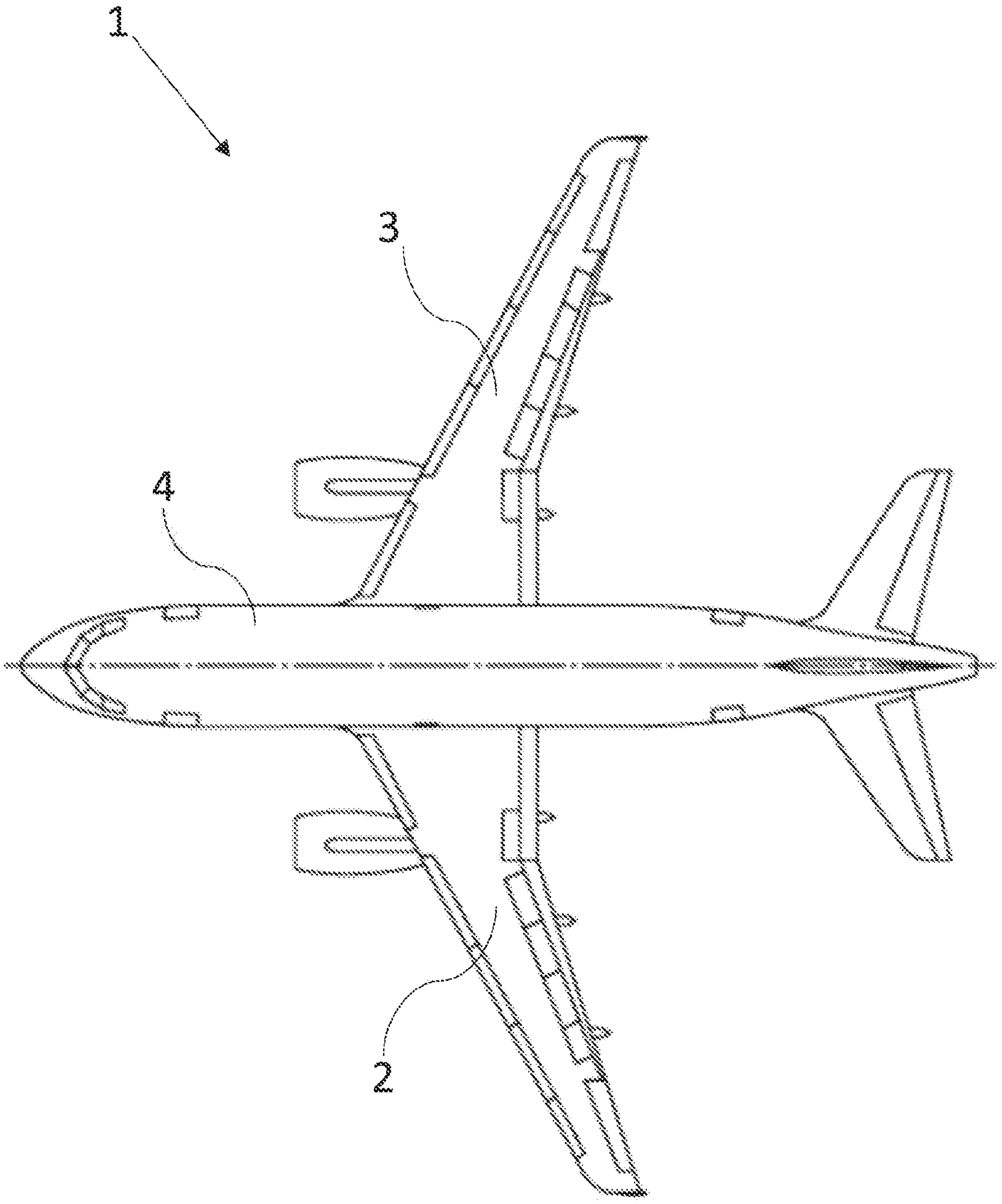
FIG. 1 shows an aircraft.

FIG. 1 shows an aircraft 1 with port and starboard wings 2, 3. Each wing has a cantilevered structure with a length extending in a generally spanwise direction 19 from a root to a tip (shown in FIG. 3), the root being joined to an aircraft fuselage 4. The wings 2, 3 are similar in construction so only the starboard wing 3 will be described in detail with reference to FIGS. 2 and 3.

Figure 2:
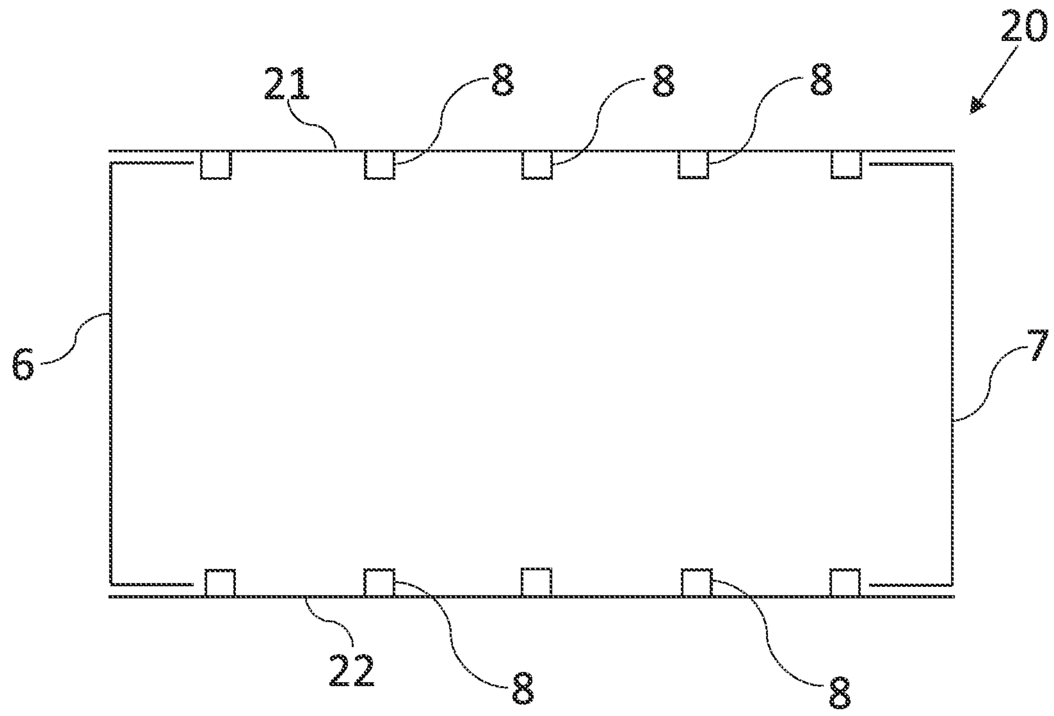
FIG. 2 is a sectional view of a wing box of the starboard wing.
Figure 3:
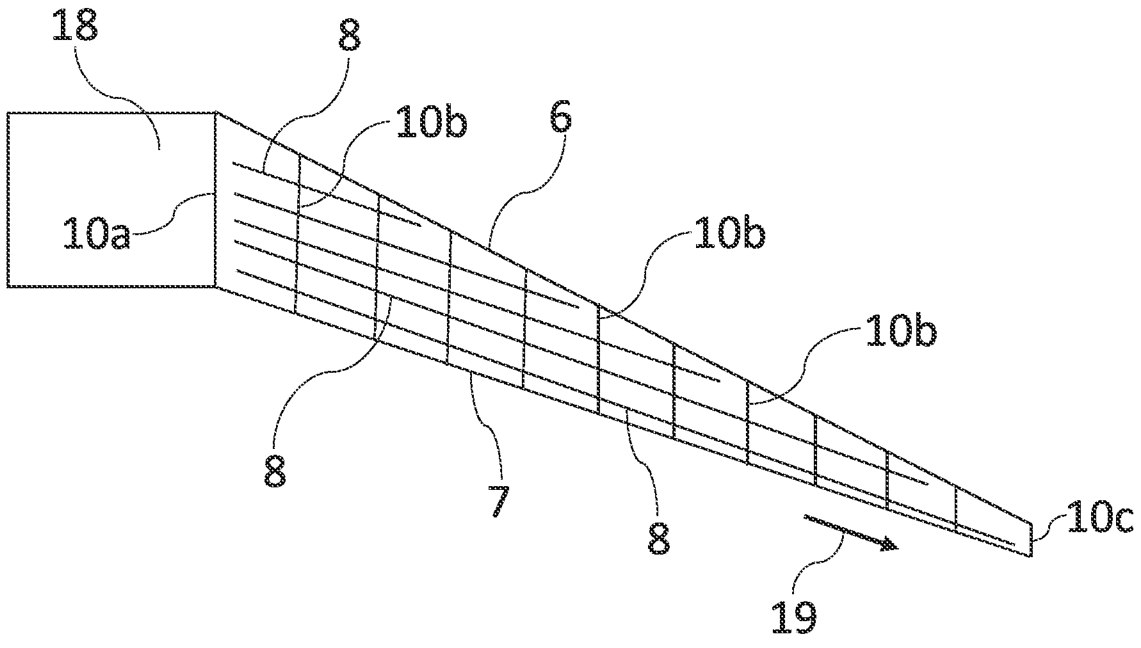
FIG. 3 shows the wing box extending along the wing.

The main structural element of the wing 3 is a wing box 20 that may be formed by upper and lower covers 21, 22 and front and rear spars 6, 7 shown in cross-section in FIG. 2. The covers 21, 22 and spars 6, 7 may each be formed of Carbon Fibre Reinforced Polymer (CFRP) laminate components. Each cover 21, 22 comprises a panel assembly and may have a curved aerodynamic outer surface (e.g. the upper surface of the upper cover 21 and the lower surface of the lower cover 22) over which air flows during flight of the aircraft 1. Each cover 21, 22 has an inner surface carrying a series of stiffeners 8 extending in the spanwise direction 19 (only some of the stiffeners 8 are labelled so as to improve the clarity of the figures). Each stiffener 8 is joined to one cover 21, 22 but not the other.

The wing box 20 has a plurality of transverse ribs, each rib being joined to the covers 21, 22 and the spars 6, 7. The ribs 10 may include an inner-most inboard rib 10*a* located at the root of the wing box 20, an outer-most rib 10*c* at the tip of the wing box 20, and one or more mid-span ribs 10*b* between the inner-most and outer-most ribs 10*a*, 10*c*. The inner-most rib 10*a* may be an attachment rib which forms the root of the wing box 20 and is joined to a centre wing box 18 within the body of the fuselage 4. Each rib 10*a*, 10*b*, 10*c* may connect the upper cover 21 to the lower cover 22. The stiffeners 8 may pass through rib recesses (not shown) in the ribs 10*b*.

A pipe assembly 30 extends through one of more of the wing ribs 10*a*, 10*b*, 10*c*, for example between an aircraft engine and a fuel tank, or a refuelling coupler and the fuel tank. The pipe assembly 30 extends in a generally spanwise direction between the root of the wing 3 to the tip of the wing 3.

Figure 4:
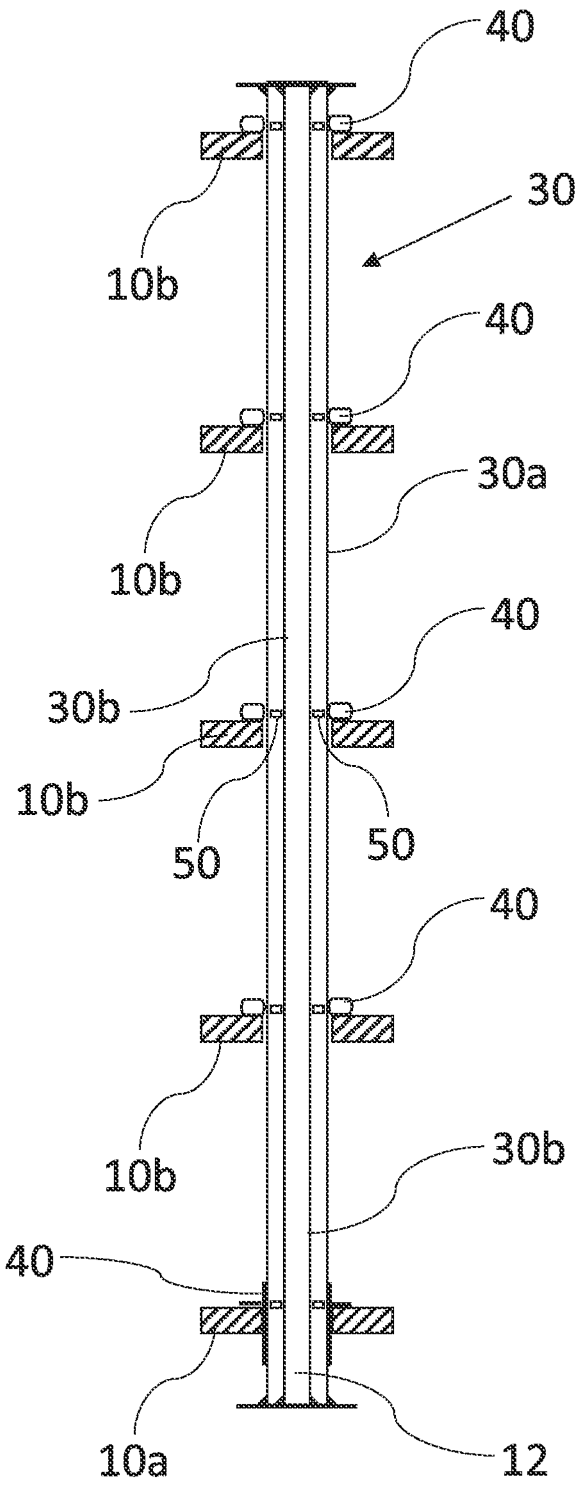
FIG. 4 shows a pipe assembly extending along the wing.

FIG. 4 is a schematic cross-sectional view showing the pipe assembly 30 extending through the inboard rib 10*a* at the root of the wing 3, and a series of four of the mid-span ribs 10*b*. In particular, the pipe assembly 30 passes through the plane of each rib 10*a*, 10*b*. The pipe assembly 30 may pass through an aperture (not shown) in each of the ribs 10*a*, 10*b*.

The pipe assembly 30 is double-walled with an outer pipe 30*a* and an inner pipe 30*b* enveloped by the outer pipe 30*a*. The inner pipe 30*b* is arranged to carry cryogenic fuels, such as liquid hydrogen. To maintain the cryogenic fuel at cryogenic temperatures, it is important to minimise thermal losses from the pipe assembly 30. To achieve this, the interspace between the outer pipe 30*a* and the inner pipe 30*b* may be held at a vacuum pressure.

Pipe spacers 50 are fitted between the outer pipe 30*a* and the inner pipe 30*b* to keep the outer and inner pipes 30*a*, 30*b* coaxial and transmit radial loads between them. The pipe spacers 50 are each integrally formed so as to surround the inner pipe 30*a*, 30*b* and can be distributed at intervals along the length of the pipe assembly 30.

The pipe assembly 30 is coupled to each rib 10*a*, 10*b* by a fixture arrangement 40.

The fixture arrangement 40 associated with the inboard rib 10*a* is configured to restrict translational movement of the pipe assembly 30 in the longitudinal direction relative to the rib 10*a*, restrict translational movement of the pipe assembly 30 in the plane of the rib 10*a* (i.e. radial movement from a longitudinal axis 12 of the pipe assembly 30), and allow rotation of the pipe assembly 30 relative to the rib 10*a* about the longitudinal axis 12. By restricting movement of the pipe assembly 30*a* along the longitudinal axis 12 at one or more points (in this case only the inboard rib 10*a*), the pipe assembly 30 is prevented from sliding freely through the wing box 20.

The fixture arrangements 40 associated with each mid-span rib 10*b* is configured to restrict translational movement of the pipe assembly 30 in the plane of the rib 10*b* (i.e. radial movement from a longitudinal axis 12 of the pipe assembly 30), but allows translational movement in the longitudinal direction (i.e. the direction of the longitudinal axis 12*a*) and rotation about three perpendicular axes.

In this manner, the pipe assembly 30 is simply supported by the fixture arrangements 40 such that shear loads are transmitted from the aircraft wing structure, through the ribs 10*a*, 10*b*, to the pipe assembly 30, whilst bending loads are minimised or mitigated. This can be particularly important in cryogenic applications due to the increased thickness of the fuel pipes 30*a*, 30*b* generally required compared to fuel pipes in non-cryogenic applications. These fuel pipes 30*a*, 30*b* may be formed of relatively stiff materials such as metals, and for example stainless steel.

Figure 5:
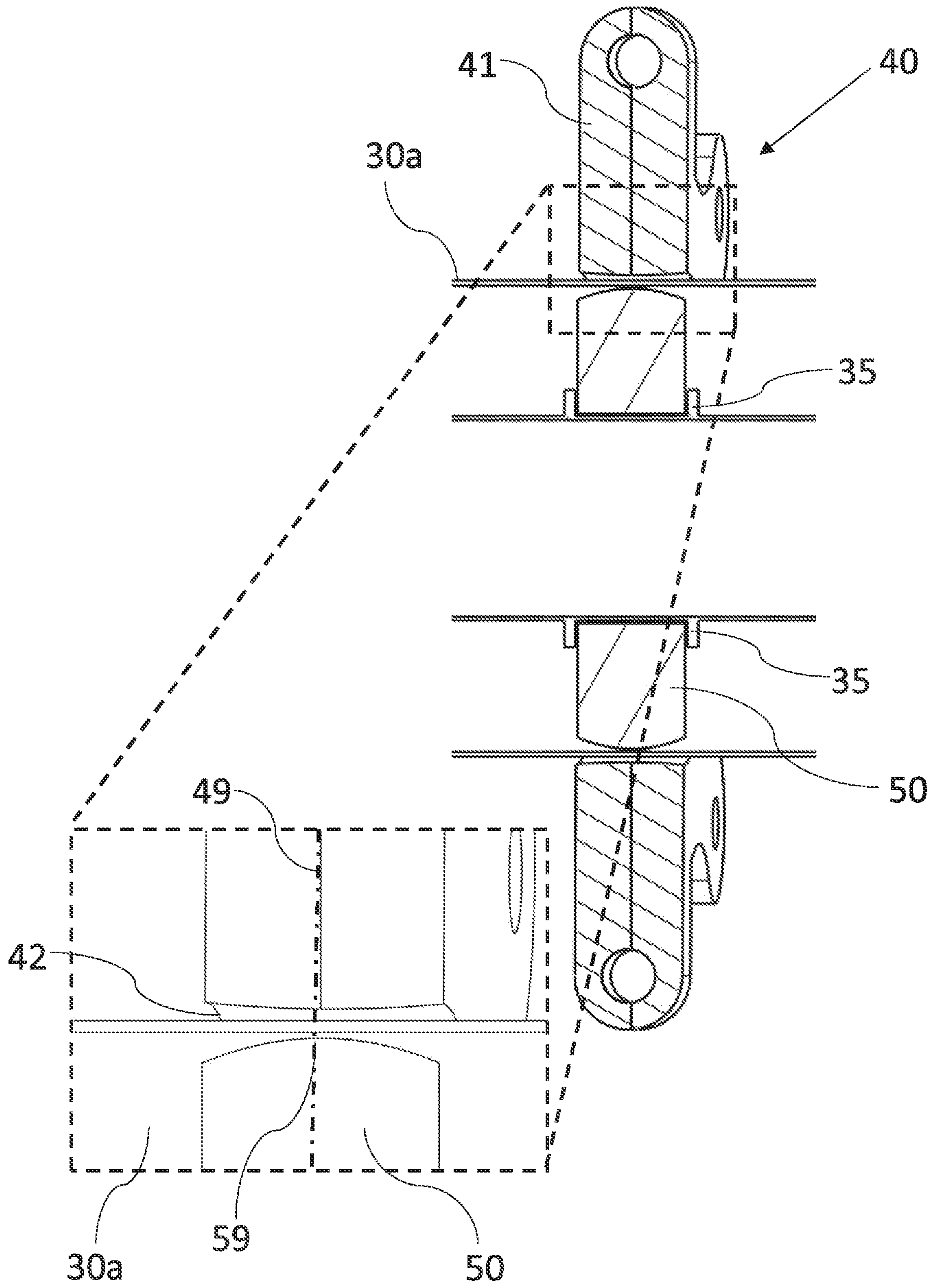
FIG. 5 shows a fixture arrangement coupling the pipe assembly to the rib.
Figure 6:
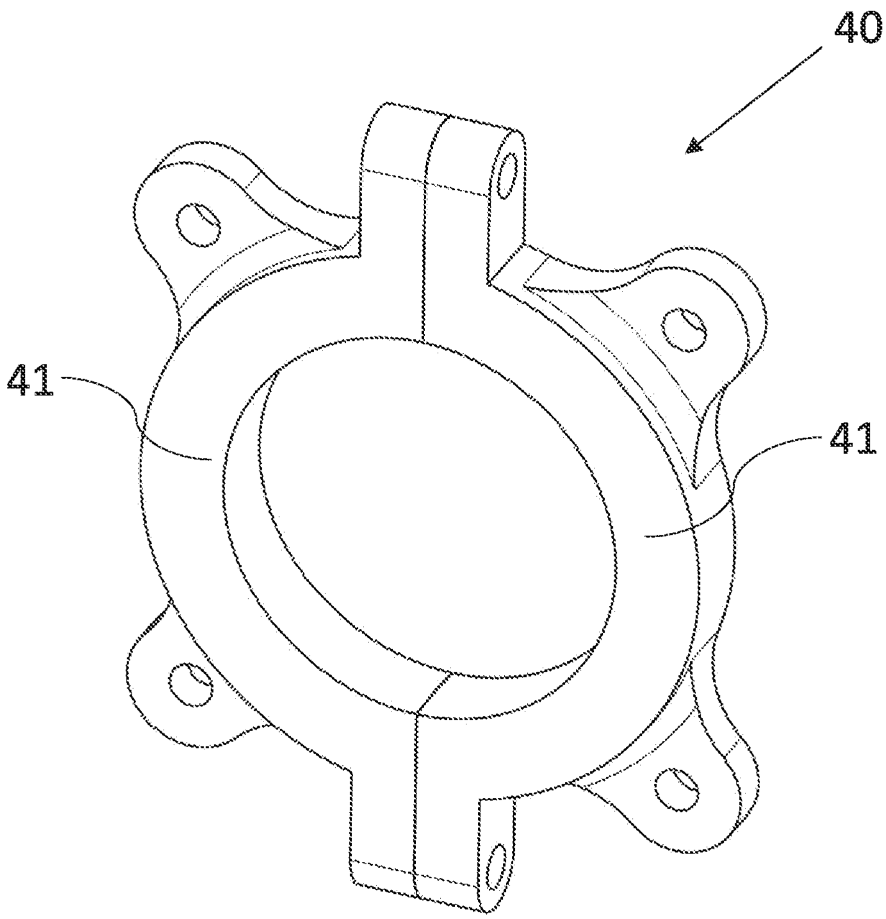
FIG. 6 shows the fixture arrangement in perspective view.
Figure 7:
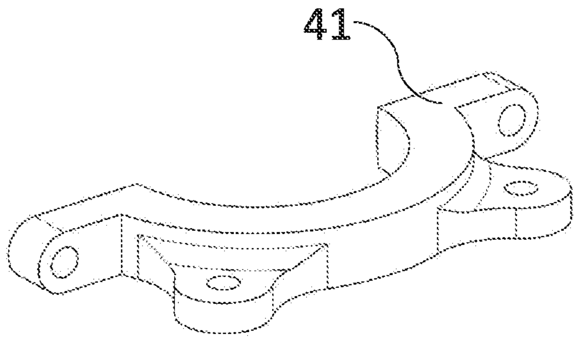
FIG. 7 shows a half-portion of the fixture arrangement.

FIGS. 5 to 7 show an example of a fixture arrangement 40 at a mid-span rib 10*b*.

Each fixture arrangement 40 comprises a pair of generally C-shaped parts 41 that are brought together around the pipe assembly 30 to lightly grip the outer pipe 30*a*, or provide minimal contact that allows the pipe assembly 30 to slide, before being fastened to the rib 10*b*.

Each of the generally C-shaped parts 41 has an internal face 42 that faces the pipe assembly 30. Each internal face 42 is rounded in the spanwise direction, as can be seen in the inset of FIG. 5. This enables the pipe assembly 30 to rotate relative to the fixture arrangement 40 about three perpendicular axes by rolling around the rounded internal face. This accommodates bending and/or twisting of the wing 3.

Each part 41 of the fixture arrangement 40 is formed with a low-friction material, which enables the pipe assembly to easily translate in the longitudinal direction, and rotate about the longitudinal axis 12, with a low-friction sliding interaction with the internal face 42 of the fixture arrangement 40. This further accommodates bending and/or twisting of the wing without transmitting loads into the mid-span ribs 10*b*.

The pipe spacers 50 are placed at intervals along the pipe assembly 30 to separate the inner and outer pipes 30*a*, 30*b*. To effectively transfer shear loads from the ribs 10*a*, 10*b* to the inner pipe 30*b*, the pipe spacer 50 is positioned as close to the fixture arrangement 40 as possible. In particular, the fixture arrangement 40 contacts the outer pipe 30*a* in a plane that passes through the pipe spacer 50. This minimises the development of bending loads in the inner pipe 30*b*, whilst effectively maintaining the distance between the inner and outer pipes 30*a*, 30*b* so as to maintain thermal insulation performance.

FIG. 5 shows an example of this. In this example, the curved internal face 42 provides a line contact of the fixture arrangement 40 with the pipe assembly 30. In other words, only an apex of the internal face 42 contacts the pipe assembly 30 so as to define a single plane 49 on which the line contact is positioned. This plane 49 passes through the pipe spacer 50. In fact, in the example of FIG. 5, the pipe spacer 50 defines a line contact with an inner surface of the outer pipe 30*a*, and the plane 49 of contact of the fixture arrangement 40 is coincident with the plane 59 of contact of the pipe spacer 50.

Alignment of the planes 49, 59 of the fixture arrangement 40 and the pipe spacer 50 provides the optimal load transfer therebetween, however it will be appreciated that effective load transfer that minimises induced bending loads caused by an offset between the fixture arrangement 40 and the pipe spacer 50 can be achieved with some degree of misalignment. For example, the plane 49 of contact of the fixture arrangement 40 may pass through the pipe spacer 50 whilst being offset from the plane 59 of contact of the pipe spacer 50.

Whilst the above examples refer to line contact between the pipe assembly 30 and one of the fixture arrangement 40 and the pipe spacer 50, it will be appreciated that one or both of the fixture arrangement 40 and pipe spacer 50 may have a cylindrical contact surface with the pipe assembly 30 such that multiple planes of contact may be defined. Bending loads can be significantly reduced by ensuring one of the planes 49 of contact of the fixture arrangement 40 passes through the pipe spacer 50.

Figure 8:
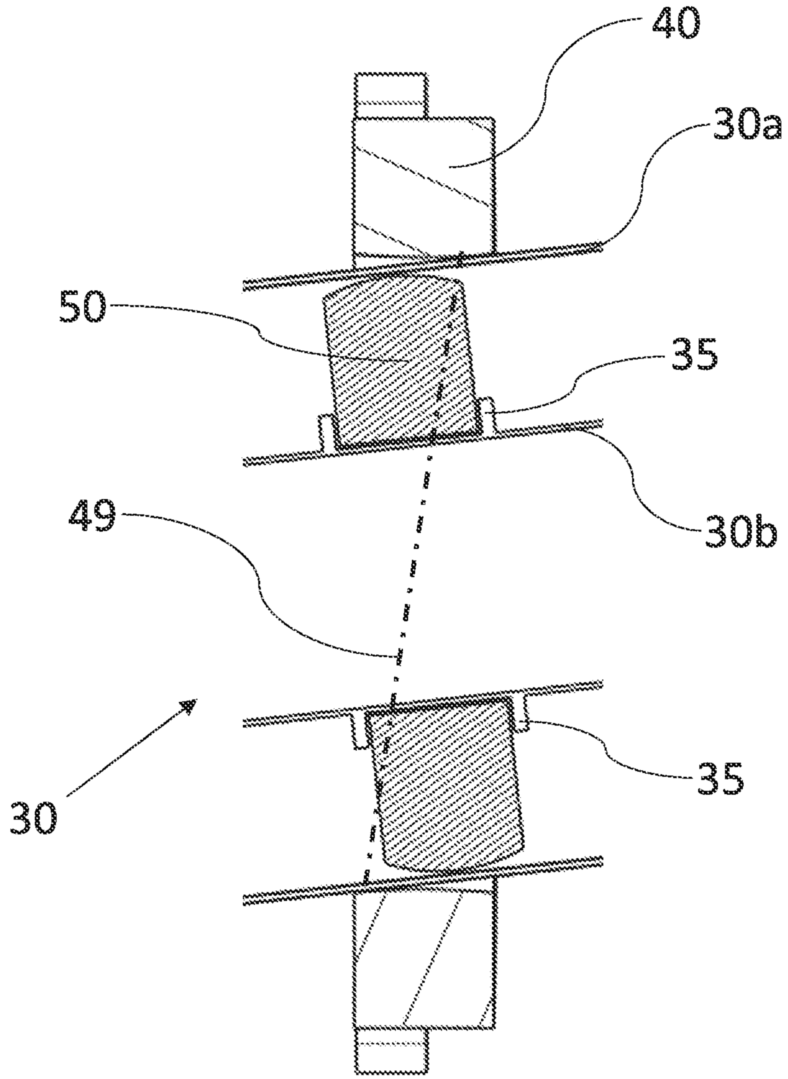
FIG. 8 shows a cross-section of the pipe assembly extending through the rib plane at an oblique angle.

In some examples, for example as shown in FIG. 8, the pipe assembly 30 extends through the rib 10*b* at an oblique angle to the plane of the rib 10*b*, with the plane 49 of contact of the fixture arrangement 40 at an oblique angle to a plane of the pipe spacer 50. Even so, the fixture arrangement 40 contacts the outer pipe 30*a* in a plane which passes through the pipe spacer 50, thereby reducing bending loads in the pipe assembly 30. Typically, this oblique angle is in a horizontal plane, whereas the pipe assembly 30 passes through normal to a vertical plane. This means that the top and bottom of the pipe spacer 50 may be located substantially within a centre plane of the fixture arrangement 40, even if the lateral parts of the pipe spacer 50 are at least partially offset from the centre plane of the fixture arrangement 40.

The pipe assembly 30 may include one or more flanges 35 arranged to restrict or prevent axial movement of the pipe spacer 50. This allows the pipe spacer 50 to be maintained in a specified position along the longitudinal axis 12 of the pipe assembly 30. FIGS. 5 and 8 show the inner pipe 30*b* having flanges 35 on either side of the pipe spacer 50 that extend radially from the inner pipe 30*a* towards the outer pipe 30*a* so as to restrict axial movement of the pipe spacer 50.

An example of a pipe spacer 50 in perspective view is shown in FIG. 9. The pipe spacer 50 is arranged to balance the competing requirements of efficient load transfer and structural integrity with thermal shielding of the hydrogen fuel in the inner pipe 30*b*.

The pipe spacer 50 may be formed of any suitable material, such as fibre reinforced composite material, and in particular glass fibre reinforced composite material. This can provide high specific stiffness and strength, whilst reducing thermal transfer compared to alternative materials such as metal.

The pipe spacer 50 includes an outer circumferential bearing surface 51 for contacting the outer pipe 30*a* and an inner circumferential bearing surface 53 for contacting the inner pipe 30*b*.

The pipe spacer 50 includes a plurality of outer lobes 52 (also referred to as teeth) each having an apex on which the outer circumferential bearing surface lies 51 and a plurality of inner lobes 54 on which the inner circumferential bearing surface 53 lies. The inner and outer lobes 51, 53 are circumferentially spaced by recesses 55*a*, 55*b*. The recesses 55*a*, 55*b* reduce contact between the pipe spacer 50 and the outer pipe 30*a*, as well as the pipe spacer 50 and the inner pipe 30*b*. This reduced contact reduces thermal transfer between the inner and outer pipes 30*a*, 30*b*, in contrast to a pipe spacer 50 in which the circumferential bearing surfaces 51, 53 extend around the full circumference of the pipe spacer 50 (i.e. the pipe spacer is absent of recesses 55*a*, 55*b*).

It will be appreciated that the ratio of the circumferential lengths of the outer circumferential bearing surface 51 and the outer circumferential recesses 55*a* provide a trade-off. Typically, the longer the outer circumferential bearing surface 51 is in comparison to the outer circumferential recess 55*a*, the greater the load bearing capacity of the spacer 50 and the greater the thermal transfer. This similarly applies to the inner circumferential bearing surface 53 and the inner circumferential recesses 55*b*.

The inner circumferential bearing surface 53 may be cylindrical. In this manner, the pipe spacer 50 may be rotatable about the axis 12 of the pipe assembly 30, whilst being unable to rotate in an axis perpendicular to the axis 12 of the pipe assembly 30. This can allow the angular position of the pipe spacer 50 to be more effectively controlled.

The outer circumferential bearing surface 51 is curved in two orthogonal directions. This minimises contact between the pipe spacer 50 and the outer pipe 30*a*. In particular, the curvature may provide for a single line of contact that extends around the circumference of the pipe spacer 50 (referred to as line contact) between the outer pipe 30*a* and the pipe spacer 50. This reduces thermal transfer between the pipe spacer 50 and the outer pipe 30*a*. The curvature also minimises rotational constraints between the outer and inner pipes 30*a*, 30*b* by allowing relative rotation in three orthogonal directions. Line contact is preferable to point contact due to the decrease in stress concentrations, i.e. the load is shared along the line of contact rather than concentrated at a single point.

As the inner pipe 30*b* has a smaller diameter than the outer pipe 30*a*, the bending curvature of the pipes 30*a*, 30*b* differs. By providing for relative rotation between the inner and outer pipes 30*a*, 30*b*, the build-up of stresses adjacent the pipe spacer 50 are reduced. Meanwhile, the pipe spacer 50 maintains a fixed distance between the inner and outer pipes 30*a*, 30*b* at the axial position of the pipe spacer 50.

The optimal curvature of the of the outer circumferential bearing surface 51 is spherical. This provides the same curvature in all planes of the pipe spacer, and ensures line contact is maintained at all rotational angles of the pipe spacer 50. This is shown schematically in FIGS. 10A-10C.

FIG. 10B shows the pipe spacer 50 in a neutral position in which the line contact lies in a plane normal to the longitudinal axis 12 of the pipe assembly 30. As the pipe spacer 50 is rotated about an axis perpendicular to the longitudinal axis 12 of the pipe assembly 30 (as in shown in FIG. 10A and 10C), the spherical outer circumferential bearing surface 51 maintains line contact with the outer pipe 30*a*.

It will be appreciated that the pipe spacer 50 may have curvature other than spherical, however such curvature may introduce stresses and decrease thermal insulation due to an increased contact (i.e. surface contact rather than line contact) between the outer pipe 30*a* and the outer circumferential bearing surface 51 at some or all angles of rotation of the pipe spacer 50.

In order to utilise the full axial extent (i.e. the extent of the pipe spacer 50 in the longitudinal axis 12 of the pipe assembly 30, or more specifically the longitudinal axis of the inner pipe 30*b*), the curvature of the outer circumferential bearing surface 51 may extend across the axial extent of the pipe spacer 50. This can allow the pipe spacer 50 to maximise the permitted rotation of the pipe spacer 50 whilst maintaining spacing between the outer pipe 30*a* and the inner pipe 30*b*.

In order to provide sufficient structural integrity (e.g. buckling resistance), as well as maximising the permittable effective rotation of the pipe spacer 50, whilst minimising the size of the pipe spacer 50, the pipe spacer may have a diameter to thickness aspect ratio of less than 6:1. The specific example shown in FIG. 8 has an aspect ratio of approximately 4:1.

Figure 11:
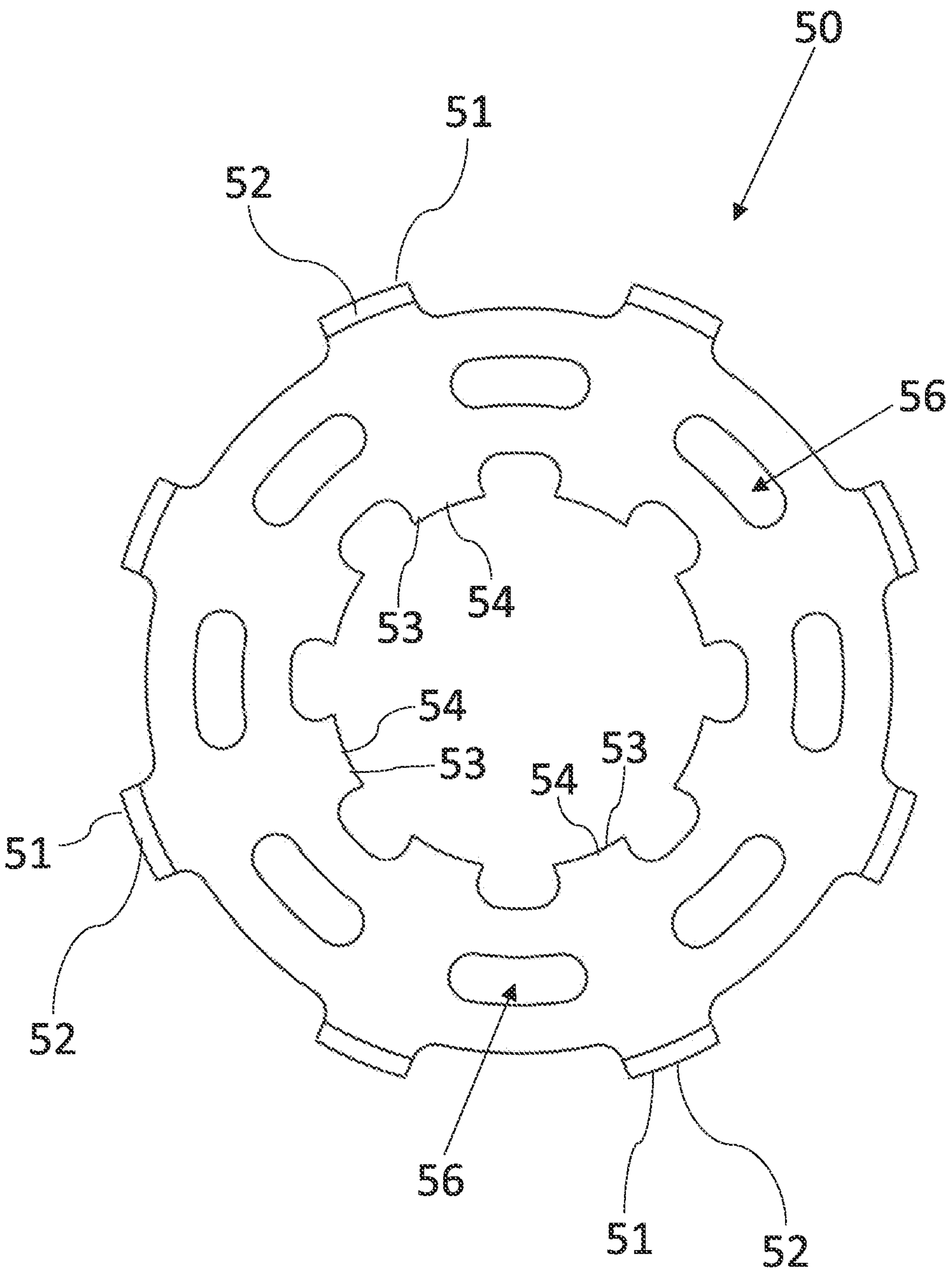
FIG. 11 shows a cross-section of the pipe spacer.

FIG. 11 shows a cross-section of the pipe spacer 50 showing the alignment of the inner lobes 54 with the outer lobes 52. In particular, a centre of each inner lobes 54 aligns circumferentially with a centre of each outer lobes 52. Such an arrangement provides a direct, radial load path that provides increased structural integrity that if the inner lobes 54 and outer lobes 52 were misaligned. Alternatively, the inner lobes 54 may be offset from the outer lobes 52 (either entirely or partially) so as to provide a tortuous thermal path that decreases thermal transfer across the pipe spacer 50.

A similar trade-off between structural integrity and thermal transfer may be decided by the circumferential extent of the outer lobes 52, and in particular the outer circumferential bearing surface 51, as well as the circumferential extent of the inner lobes 54, and in particular the inner circumferential bearing surface 53. Large inner and outer lobes 52, 54 will increase structural integrity but also increase thermal transmission. In the example shown in FIG. 11, the outer lobes 52 occupy no more than 50% of the circumference of the pipe spacer 50, whilst the inner lobes 52 occupy no more than 70% of the circumference of the pipe spacer 50, although these values may be tailored to particular requirements.

To further decrease thermal transfer between the inner pipe 30*b* and the outer pipe 30*a*, the pipe spacer 50 may define three or more through-holes 56 located between the inner and outer circumferential bearing surfaces 51, 53. A centre of the through-holes 56 may be aligned circumferentially with a centre of the outer and/or inner lobes 52, 54, so as to create a tortuous thermal path across the pipe spacer 50 and thereby decrease thermal transmission. Alternatively, for example as shown in FIG. 11, the through-holes 56 may be offset circumferentially from the outer and/or inner lobes 52, 54. This can provide a direct load path between the outer and inner lobes 52, 54.

Figure 12A:
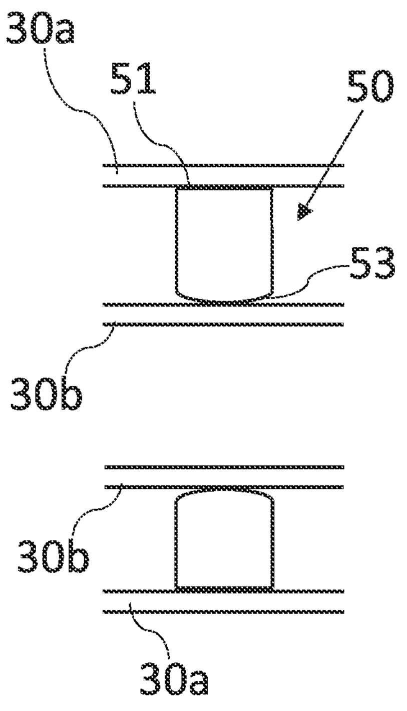
FIG. 12A shows a second example of a pipe spacer with the inner and outer pipes aligned.
Figure 12B:
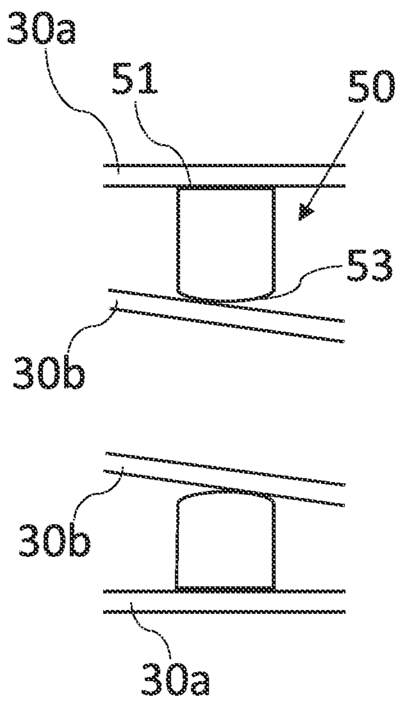
FIG. 12B shows the inner pipe rotated with respect to the outer pipe.

Whilst the above example describes an outer circumferential bearing surface 51 that is curved in two orthogonal directions, in alternative examples the inner circumferential bearing surface 53 may be curved in two orthogonal directions. Such an example is shown in FIGS. 12A and 12B, in which the outer circumferential bearing surface 51 is shown to be cylindrical.

It will be clear to the skilled person that the examples described above may be adjusted in various ways.

Whilst the present example in described as conveying liquid hydrogen, it will be appreciated that other fuels, and particularly cryogenic fuels, may be adopted. For example, a gaseous hydrogen fuel may be used. In this case, an inert gas may replace the vacuum in the interspace between the outer pipe 30*a* and the inner pipe 30*b*.

In the present example, the fixture arrangement 40 provides at least some relative freedom of movement to the pipe assembly 30, however it will be appreciated that the benefits of the pipe spacer 50 may also benefit an assembly in which the fixture arrangement 40 fully constrains the pipe assembly 30 at the rib 10*a*, 10*b*.

The examples described above have focussed on a fixture arrangement 40 attached to a wing rib 10*a*, 10*b*, however it will be appreciated that the pipe spacer 50 may be suitably applied to a pipe assembly 30 in combination with a range of aircraft structures, including fairing ribs (leading or trailing edge fairings that are outside of the main wing box 20 of the wing 3) and fuselage frames.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A pipe spacer for separating inner and outer pipes of a double-walled pipe assembly, the pipe spacer comprising:

an inner circumferential bearing surface for contacting an inner pipe of a double-walled pipe assembly;

an outer circumferential bearing surface for contacting an outer pipe of the double-walled pipe assembly;

at least three inner lobes, each of the inner lobes having an apex on which lies the inner circumferential bearing surface;

wherein the outer circumferential bearing surface is curved in two orthogonal directions; and, wherein the inner circumferential bearing surface is cylindrical.

2. The pipe spacer of claim 1, wherein the outer circumferential bearing surface is spherical.

3. The pipe space of claim 1, wherein the curvature of the outer circumferential bearing surface extends across the axial extent of the pipe spacer.

4. The pipe spacer of claim 1, further comprising three or more outer lobes, each of the outer lobes having an apex on which lies the outer circumferential bearing surface.

5. The pipe spacer of claim 4, wherein a centre of each inner lobes aligns circumferentially with a centre of each outer lobes.

6. The pipe spacer of claim 4, wherein each of the three or more outer lobes occupy less than or equal to 50% of the circumference of the pipe spacer.

7. The pipe spacer of claim 4, defining three or more through-holes located between the inner and outer circumferential bearing surfaces, or wherein a centre of the through-holes is aligned circumferentially with a centre of the inner and/or outer lobes, or wherein the through-holes are offset circumferentially from the inner and/or outer lobes.

8. The pipe spacer of claim 1, wherein the pipe spacer has a diameter to thickness aspect ratio of less than 6:1.

9. The pipe spacer of claim 1, formed of fibre reinforced composite material.

10. A double-walled pipe assembly comprising an inner pipe and an outer pipe separated by the pipe spacer of claim 1.

11. The double-walled pipe assembly of claim 10, wherein the inner pipe comprises first and second flanges extending radially from the inner pipe towards the outer pipe, wherein the pipe spacer is located between the first and second flanges such that axial movement of the pipe spacer is restricted.

12. The double-walled pipe assembly of claim 10, further comprising a vacuum pressure between the inner pipe and the outer pipe.

13. The double-walled pipe assembly of claim 10, further comprising a cryogenic fuel in the inner pipe, or wherein the cryogenic fuel is liquid hydrogen.

14. An aircraft assembly comprising an aircraft structure, a fixture arrangement, and the double-walled pipe assembly of claim 10 coupled to the aircraft structure by the fixture arrangement.

15. The aircraft assembly of claim 14, wherein the fixture arrangement contacts the outer pipe in a plane which passes through the pipe spacer.

16. The aircraft assembly of claim 14, wherein the aircraft structure is a wing rib, and wherein the double-walled pipe assembly passes through a plane of the wing rib.

17. An aircraft assembly, comprising:

an aircraft structure; a double-walled pipe assembly coupled to the aircraft structure by a fixture arrangement, the double-walled pipe assembly comprising inner and outer pipes; and a pipe spacer separating the inner and outer pipes, the pipe spacer comprising:

an inner circumferential bearing surface for contacting an inner pipe of a double-walled pipe assembly;

an outer circumferential bearing surface for contacting an outer pipe of the double-walled pipe assembly;

at least three inner lobes, each of the inner lobes having an apex on which lies the inner circumferential bearing surface;

wherein the outer circumferential bearing surface is curved in two orthogonal directions;

wherein the inner circumferential bearing surface is cylindrical; and, wherein the fixture arrangement contacts the outer pipe in a plane which passes through the pipe spacer.

18. The aircraft assembly of claim 17, wherein the aircraft structure is a wing rib, fairing rib, or fuselage frame.

19. The aircraft assembly of claim 17, wherein the double-walled pipe assembly is configured to rotate about axes perpendicular to a longitudinal axis of the pipe assembly.

20. A pipe spacer for separating inner and outer pipes of a double-walled pipe assembly, the pipe spacer comprising:

an inner circumferential bearing surface for contacting an inner pipe of a double-walled pipe assembly;

an outer circumferential bearing surface for contacting an outer pipe of the double-walled pipe assembly;

at least three inner lobes, each of the inner lobes having an apex on which lies the inner circumferential bearing surface;

wherein the inner circumferential bearing surface is curved in two orthogonal directions; and, wherein the outer circumferential bearing surface is cylindrical.

* * * * *